United States Patent
Kanai et al.

(10) Patent No.: US 8,915,543 B2
(45) Date of Patent: Dec. 23, 2014

(54) SUNROOF APPARATUS

(71) Applicant: Yachiyo Industry Co., Ltd., Sayama-shi, Saitama (JP)

(72) Inventors: Toshiyuki Kanai, Sakura (JP); Tatsuaki Uehara, Sakura (JP)

(73) Assignee: Yachiyo Industry Co., Ltd., Sayama-Shi (JP)

( * ) Notice: Subject to any disclaimer, the term of this patent is extended or adjusted under 35 U.S.C. 154(b) by 0 days.

(21) Appl. No.: 13/972,244

(22) Filed: Aug. 21, 2013

(65) Prior Publication Data

US 2014/0054933 A1 Feb. 27, 2014

(30) Foreign Application Priority Data

Aug. 22, 2012 (JP) ................. 2012-183039

(51) Int. Cl.
*B60J 7/047* (2006.01)
*B60J 7/043* (2006.01)

(52) U.S. Cl.
CPC ............... *B60J 7/043* (2013.01); *B60J 7/0435* (2013.01)
USPC ................. 296/220.01; 296/216.03

(58) Field of Classification Search
CPC .......... B60J 7/043; B60J 7/1642; B60J 10/12
USPC .......... 296/216.02–216.05, 220.01
See application file for complete search history.

(56) References Cited

U.S. PATENT DOCUMENTS

| | | | | |
|---|---|---|---|---|
| 4,786,102 A * | 11/1988 | Sakamoto et al. | ....... | 296/216.03 |
| 4,893,869 A * | 1/1990 | Fuerst | ....... | 296/216.03 |
| 4,968,088 A * | 11/1990 | Schurmann | ....... | 296/216.02 |
| 4,995,667 A * | 2/1991 | Tamura et al. | ....... | 296/216.03 |
| 5,765,908 A * | 6/1998 | Kelm | ....... | 296/223 |
| 6,893,083 B2 * | 5/2005 | Engl | ....... | 296/216.03 |
| 7,182,400 B2 * | 2/2007 | Grimm et al. | ....... | 296/216.08 |
| 8,444,217 B2 * | 5/2013 | Nellen et al. | ....... | 296/223 |
| 2003/0038513 A1 * | 2/2003 | Eiermann et al. | ....... | 296/223 |

FOREIGN PATENT DOCUMENTS

| | | |
|---|---|---|
| JP | 64-25921 | 2/1989 |
| JP | 2005-041345 | 2/2005 |

* cited by examiner

*Primary Examiner* — Dennis H Pedder
(74) *Attorney, Agent, or Firm* — Rankin, Hill & Clark LLP

(57) ABSTRACT

Provided is a sunroof apparatus including a movable roof panel installed in an opening in a fixed outer roof panel of a vehicle, a drive slider to move in a front-rear direction along a fixed guide frame, and a panel support stay interposing between the roof panel and the drive slider to support the roof panel. The roof panel is tilted up and moves backward by a backward moving of the panel support stay while the panel support stay is in an inclined position, as the drive slider slides backward. A part of a plurality of engagement portions between the panel support stay and the drive slider is located rearward more than a rear edge of the opening when the opening is fully opened.

1 Claim, 10 Drawing Sheets

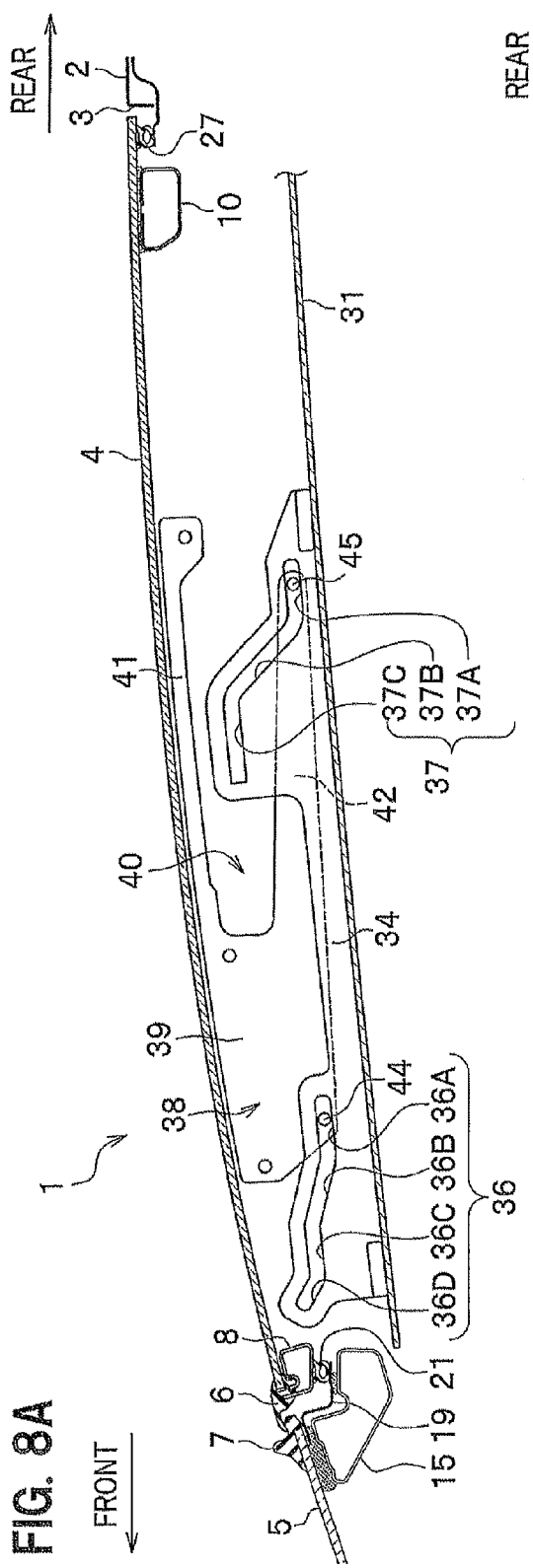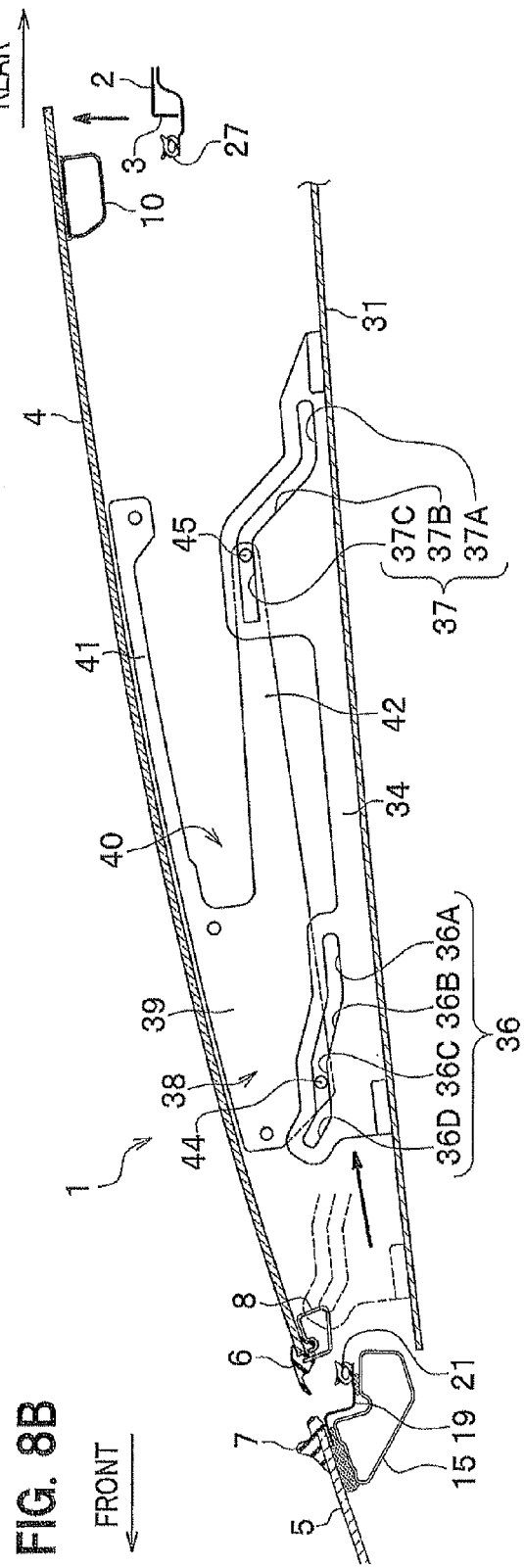

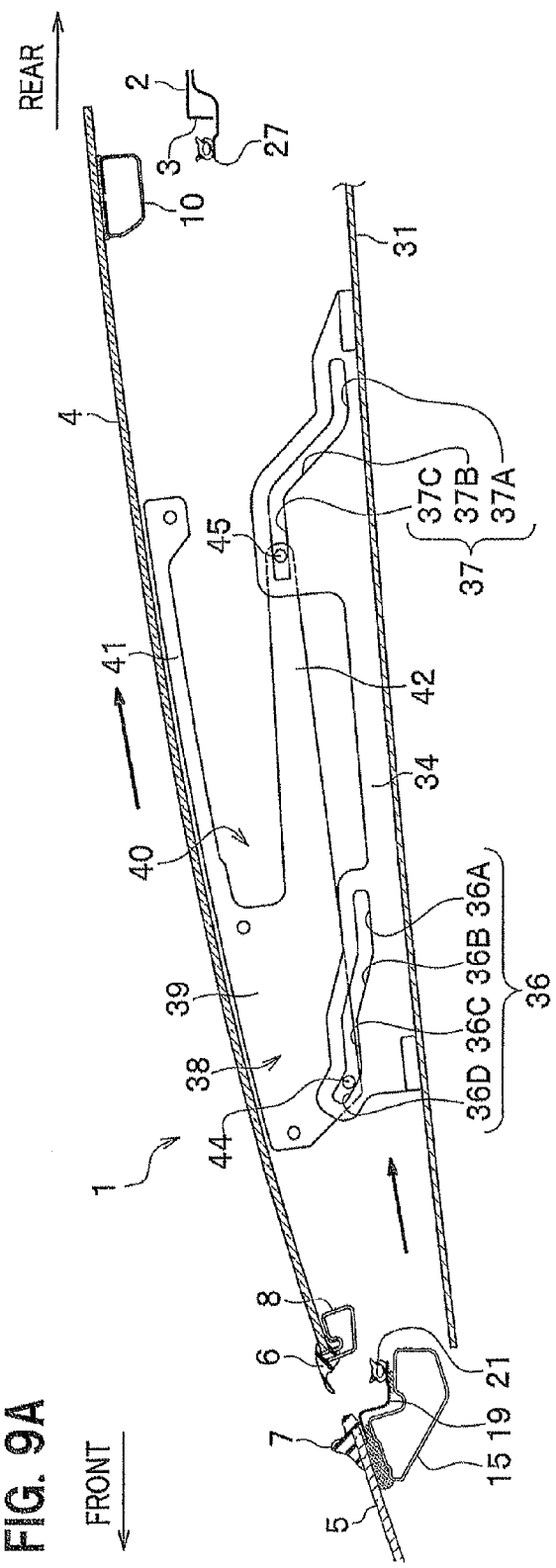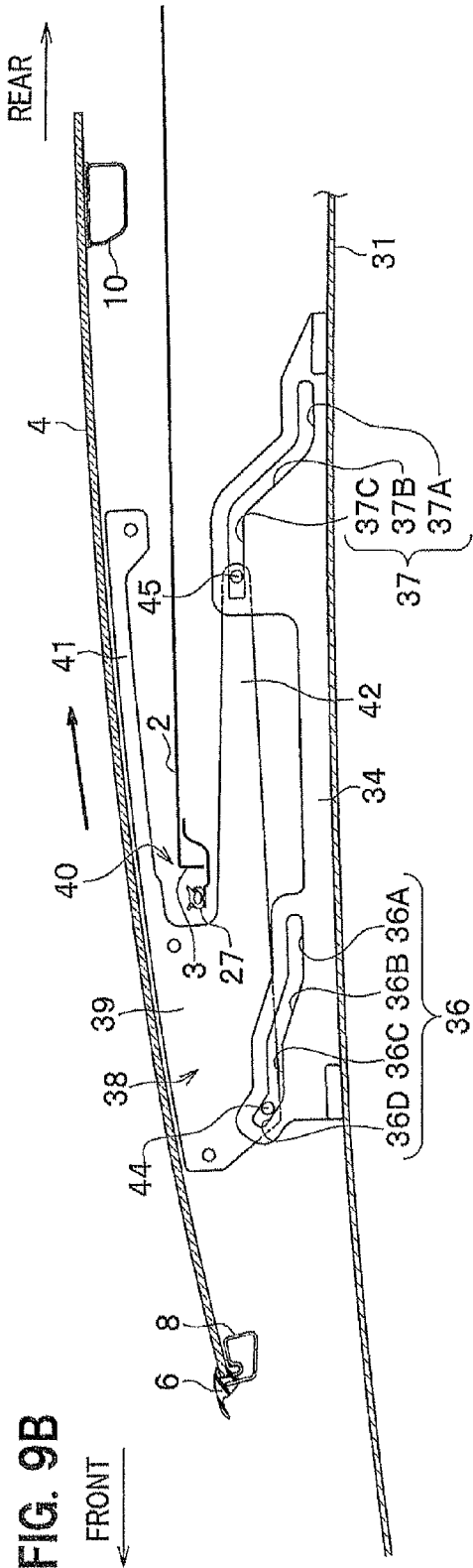

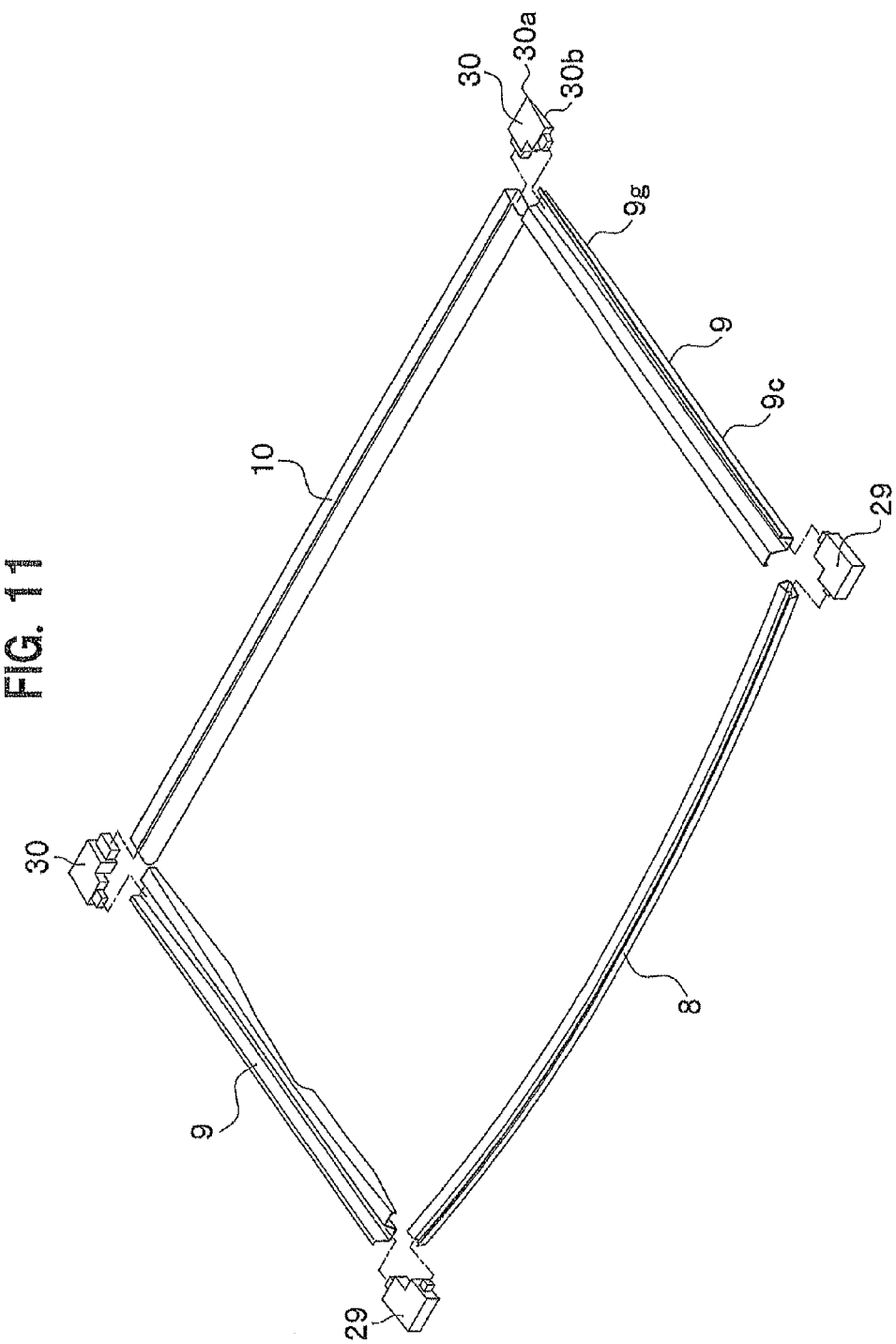

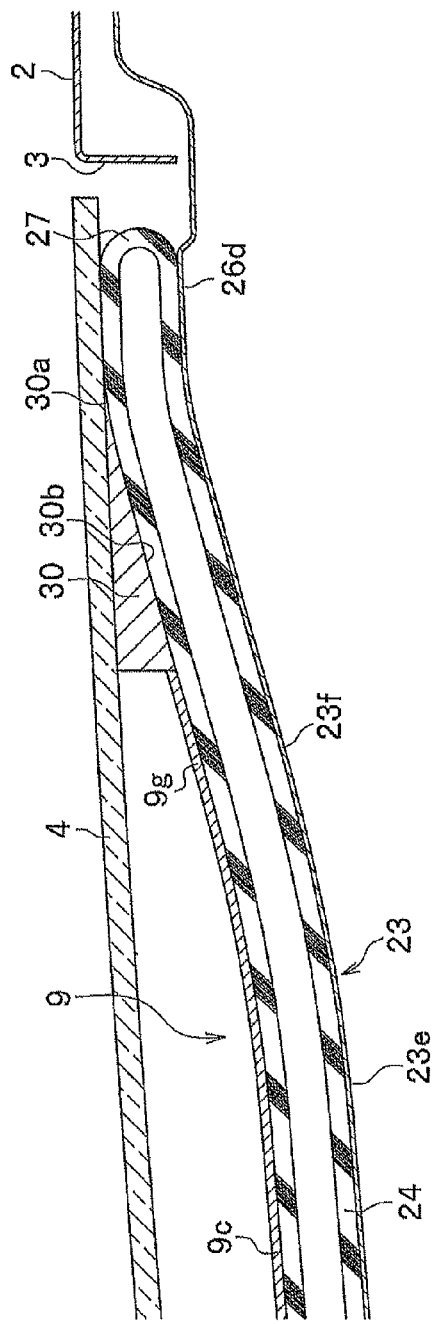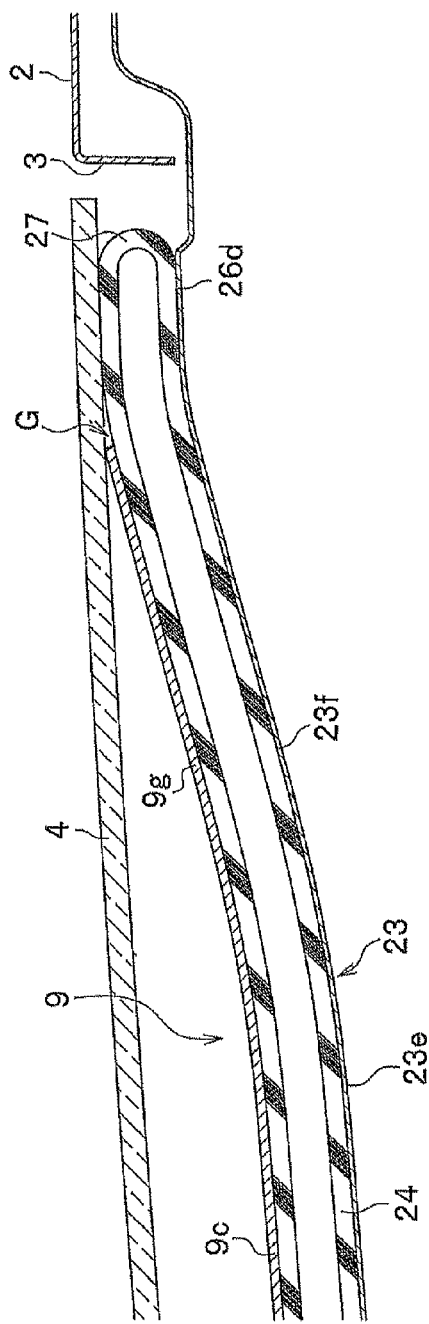

SUNROOF APPARATUS

CROSS REFERENCE TO RELATED APPLICATIONS

This application claims the foreign priority benefit under Title 35, United States Code, 119 (a)-(d) of Japanese Patent Application No. 2012-183039 which is filed on Aug. 22, 2012 in the Japan Patent Office, the disclosure of which is herein incorporated by reference in its entirety.

BACKGROUND OF THE INVENTION

1. Technical Field

The present invention relates to a sunroof apparatus for a vehicle.

2. Description of Background Art

A sunroof apparatus described in the patent document 1 listed below exemplifies a prior sunroof apparatus. This sunroof apparatus includes a movable roof panel installed in an opening formed in a fixed outer roof panel of a vehicle, a drive slider to move in a front-rear direction of the vehicle, and a panel support stay interposing between the movable roof panel and the drive slider. The panel support stay moves rearward while inclining as the drive slider slides rearward. Hereby, the movable roof panel is tilted up and moves rearward.

Furthermore, the patent document 1 discloses a technology to protrude a front end portion of a guide rail for guiding the drive slider to a more forward location than a drainage ditch in a front frame. According to this technology, a span between support portions of the panel support stay for supporting the roof panel can be enlarged without sacrificing an open degree of the opening as much as the front end portion of the guide rail is protruded. Therefore, the supporting stiffness for supporting the movable roof panel can be enhanced.

Patent document 1: Japanese Patent Laid-Open Publication No. 2005-41345 (Paragraph 0025)

BRIEF SUMMARY OF THE INVENTION

However, in some cases, the front end portion of the guide rail cannot be protruded so much forward because the fixed outer roof panel around the front end of the guide rail is a panel with a narrow width along the front-rear direction of the vehicle.

At least the preferred embodiments of the present invention seek to solve such a problem. It is an object of at least the preferred embodiments of the present invention to provide a sunroof apparatus capable of enlarging a span for supporting the movable roof panel regardless of the protruding structure of the front end portion of the guide rail.

The present invention provides a sunroof apparatus comprising a movable roof panel installed in an opening formed in a fixed outer roof panel of a vehicle, a drive slider to move in a front-rear direction of the vehicle along a fixed guide frame, and a panel support stay interposing between the movable roof panel and the drive slider to support the roof panel, the movable roof panel being tilted up and moving rearward by a rearward moving of the panel support stay while the panel support stay is in an inclined position, as the drive slider slides rearward, wherein a part of a plurality of engagement portions between the panel support stay and the drive slider is located at a more rearward location than a rear edge of the opening when the opening is fully opened.

According to the above sunroof apparatus, the span for supporting the movable roof panel can be enlarged while an open degree of the opening is kept large by locating a part of the plurality of engagement portions between the panel support stay and the drive slider more rearward than the rear edge of the opening when the opening is fully opened. The plurality of engagement portions are support portions to support a load of the movable roof panel. And a part of support portions (or the plurality of engagement portions) to support a load of the roof panel is located rearward in comparison with the prior structure, so that the rearward part of support portions comes near the center of the gravity of the movable roof panel. Therefore, a load to the panel support stay becomes low.

And, the present invention provides also a sunroof apparatus, wherein the panel support stay includes a forked part having an upper part to be connected to the roof panel and a lower part to be engaged with the drive slider so as to form an opening facing rearward between the upper part and the lower part, and wherein the forked part is located so that the upper and the lower parts thereof face each other vertically across the fixed outer roof panel located behind the opening in the fixed outer roof panel when the opening in the fixed outer roof panel is fully opened.

According to the above sunroof apparatus, the span for supporting the movable roof panel can be enlarged with a simple structure of the panel support stay.

According to the present invention, the span for supporting the roof panel can be enlarged regardless of the structure around or protruding of the front end portion of the guide frame.

BRIEF DESCRIPTION OF THE SEVERAL VIEWS OF THE DRAWINGS

Certain preferred embodiments of the present invention will now be described in greater detail by way of example only and with reference to the accompanying drawings, in which:

FIG. 8A is a longitudinal sectional view for explaining the action of the sunroof apparatus of the present embodiment;

FIG. 8B is another longitudinal sectional view for explaining the action of the sunroof apparatus of the present embodiment;

FIG. 9A is further another longitudinal sectional view for explaining the action of the sunroof apparatus of the present embodiment;

FIG. 9B is another longitudinal sectional view for explaining the action of the sunroof apparatus of the present embodiment;

FIG. 11 is a perspective view showing a front panel holder, side panel holders, a rear panel holder, and front and rear joint members for connecting them together;

FIG. 12A is a longitudinal sectional view around the rear edge of the movable roof panel showing a watertight state of a seal member with an interposition of a rear joint member; and FIG. 12B is a longitudinal sectional view around the rear edge of the movable roof panel showing a watertight state of a seal member without the interposition of the rear joint member shown in FIG. 12A.

DETAILED DESCRIPTION OF THE INVENTION

Figure 1:
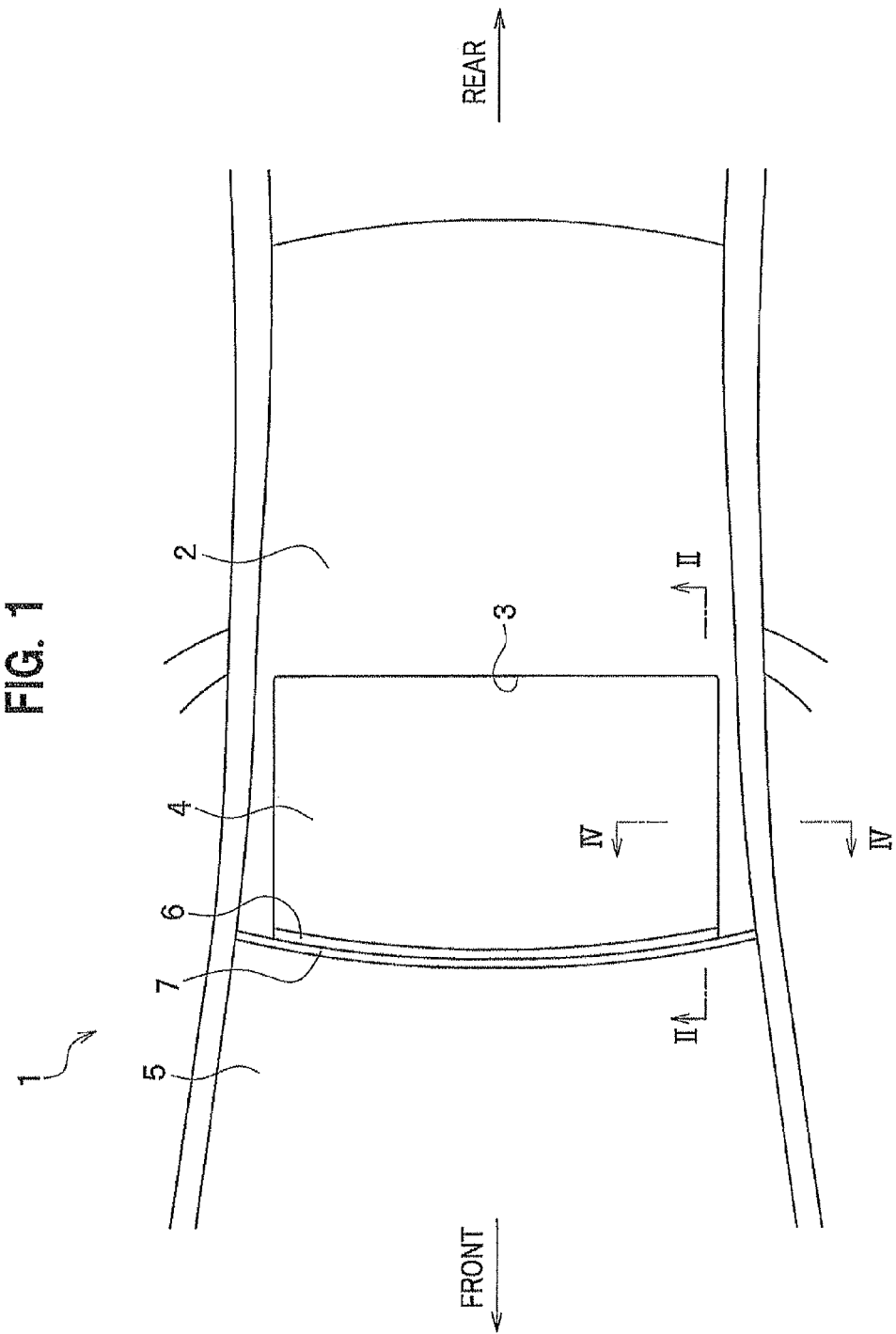
FIG. 1 is a plan view of a sunroof apparatus of the present embodiment according to the present invention.

As shown in FIG. 1, a sunroof apparatus 1 of the present embodiment according to the present invention is installed in an opening 3 formed in a fixed outer roof panel 2 (hereinafter, outer roof panel 2) of a vehicle, and is configured to be capable of opening and closing the opening 3. The sunroof apparatus 1 comprises a movable roof panel 4 (hereinafter, sometimes, roof panel 4) which is an outer roof panel to move backward in a tilted position while the opening is being opened. The roof panel 4 is made of, for example, glass or plastics.

Figure 2:
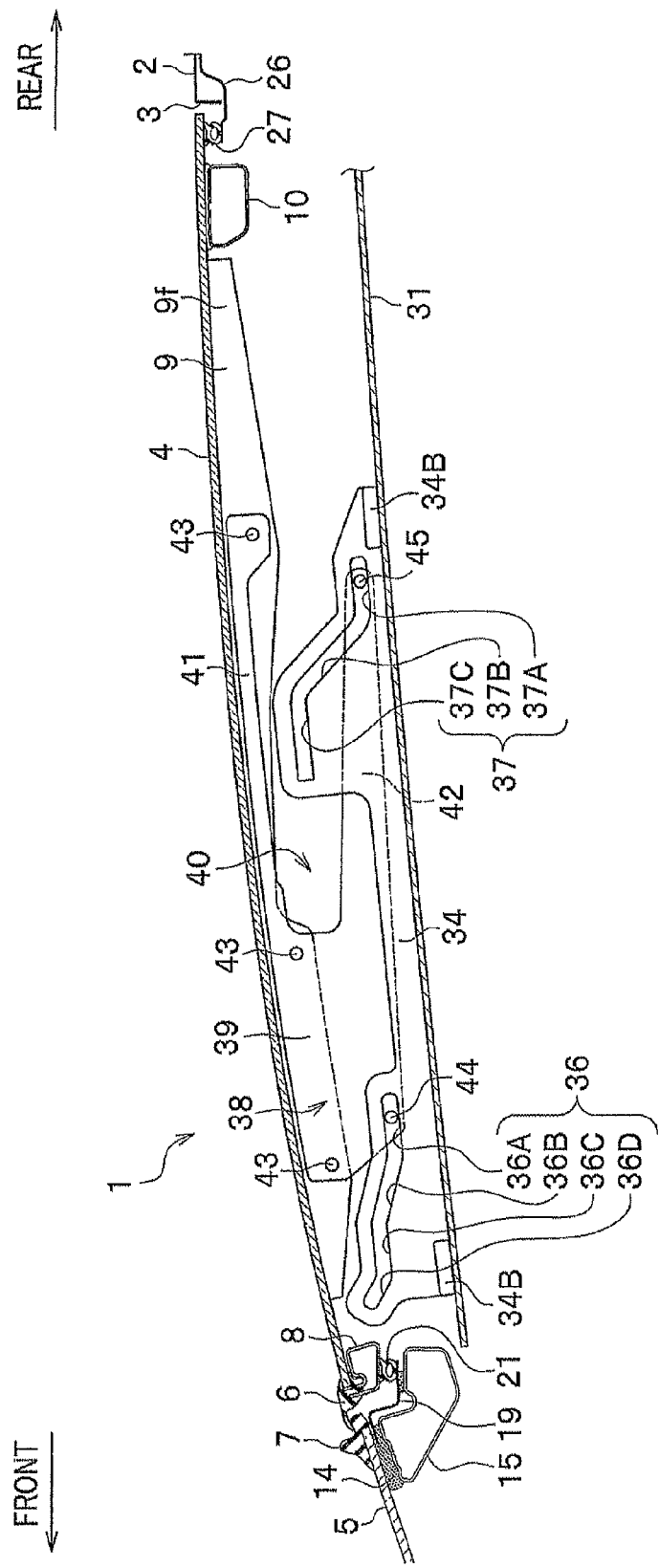
FIG. 2 is an enlarged longitudinal sectional view taken along the line II-II shown in FIG. 1.
Figure 5:
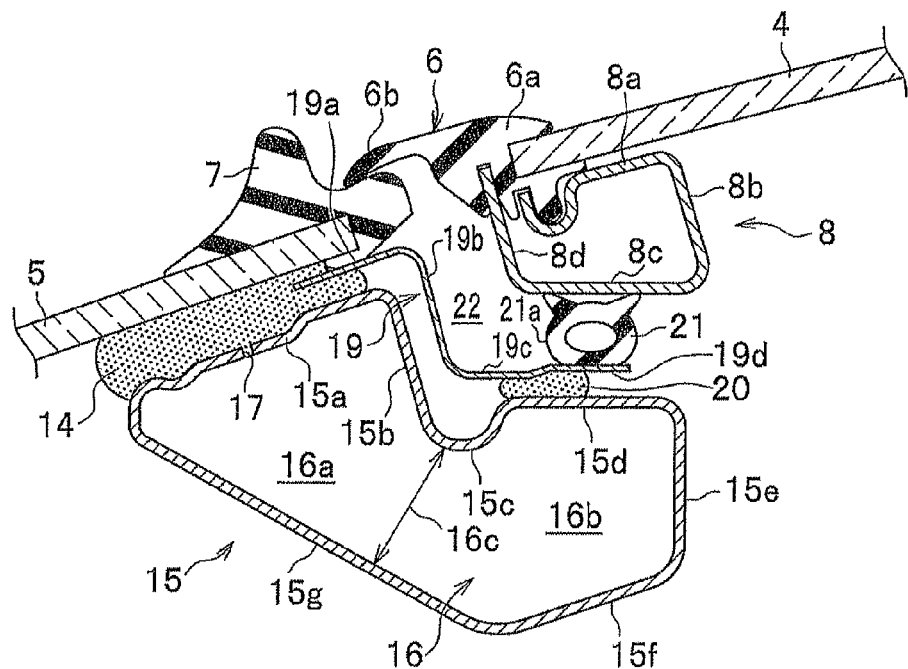
FIG. 5 is an enlarged longitudinal sectional view around the front edge of the movable roof panel shown in FIG. 2.

The opening 3 has a rectangular shape. The opening 3 is made by cutting off a front area of the outer roof panel 2 of a fixed roof. In the prior art, a movable roof panel is adjacent to a rear edge of the outer roof panel 2 in front of the opening 3 when the opening is closed. On the other hand, a front edge of the roof panel 4 when the opening 3 is closed (hereinafter, sometimes, closed roof panel 4) shown in FIGS. 1 and 2, is located at a location adjacent to an upper edge of a front window 5 without the outer roof panel 2 between them. However, the closed roof panel 4 is located adjacently to the outer roof panel 2 of the fixed roof at left and right side edges and a rear edge of the roof panel 4. Strictly speaking, a weather strip 6 made of rubber or the like and a weather strip 7 made of rubber or the like slightly abut against each other as shown in FIG. 2. The weather strip 6 is attached to a front edge portion of the roof panel 4, and the weather strip 7 is attached to an upper edge portion of the front window 5. Thus, an outer surface of the roof panel 4 near the front edge thereof and an outer surface of the front window 5 near the upper edge thereof are disposed to be a flush form. As shown in FIG. 5, the weather strip 6 has a base part 6a and a lip part 6b. The base part 6a is attached to the front edge portion of the roof panel 4, and the lip part 6b extends forward like a thin tongue from the front end of the base part 6a. The front end portion of the lip part 6b slightly abuts against a rear upper surface of the weather strip 7.

With reference to FIGS. 2 and 11, a front panel holder 8, side panel holders 9 and a rear panel holder 10 are attached with adhesive or the like to an inner surface of the roof panel 4 at the front edge, both side edges, and the rear edge, of the roof panel 4, respectively, in order to mainly reinforce the roof panel 4. The front panel holder 8, side panel holders 9 and the rear panel holder 10 are made of, for example, metal member like a plating steel plate.

As shown in FIG. 5, the front panel holder 8 has a cross sectional shape having an upper plate part 8a, a rear plate part 8b, a lower plate part 8c, and a front plate part 8d. Hereinafter, a word of "part" will be omitted from these parts 8a, 8b, 8c and 8d, and omitted also from parts like these parts described hereinafter. The upper plate 8a extends rearward and slightly upward to follow a slope of the front edge portion of the roof panel 4. The rear plate 8b extends downward and approximately orthogonally to a panel surface of the roof panel 4 from a rear end of the upper plate 8a. The lower plate 8c extends forward and approximately horizontally from a lower end of the rear plate 8b. The front plate 8d extends upward and approximately orthogonally to the panel surface of the roof panel 4 from a front end of the lower plate 8c, and an upper portion of the front plate 8d is embedded in the base portion 6a of the weather strip 6. A part near a front end of the upper plate 8a is formed to have an approximate U shape. A bottom of the U shape is protruded downward, and thus the part near a front end of the upper plate 8a is engaged with a part of the base 6a of the weather strip 6. As mentioned above, the front panel holder 8 is attached to a lower surface of the roof panel 4 through the weather strip 6. In addition thereto or in place thereof, the front panel holder 8 may be attached to the lower surface of the roof panel 4 with adhesive.

Figure 4:
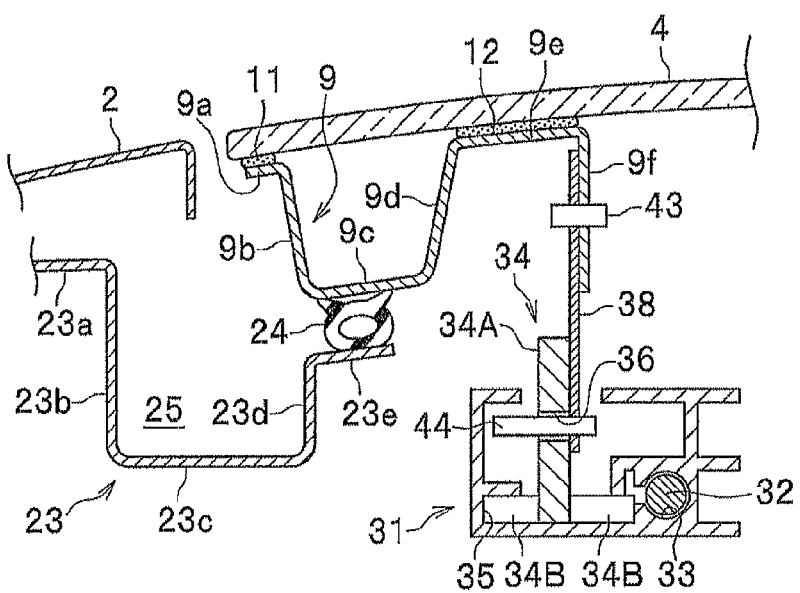
FIG. 4 is an enlarged cross sectional view taken along the line IV-IV shown in FIG. 1.

As shown in FIG. 4, the side panel holder 9 has a cross sectional shape having a first upper plate 9a, a first side plate 9b, a lower plate 9c, a second side plate 9d, a second upper plate 9e, and a bracket 9f. The first upper plate 9a is attached to a lower surface of a side edge portion of the roof panel 4 with adhesive 11. The first side plate 9b extends downward and approximately orthogonally to the panel surface of the roof panel 4 from an end of the first upper plate 9a nearer a middle of the vehicle in a width direction of the vehicle (hereinafter, a word of "vehicle" will be omitted). The lower plate 9c extends slightly upward and toward the middle of the vehicle in the width direction from a lower end of the first side plate 9b, so that the lower plate 9c slightly inclines so as to be parallel with the panel surface of the roof panel 4. The second side plate 9d extends upward from an end of the lower plate 9c nearer the middle of the vehicle in the width direction. The second upper plate 9e extends toward the middle of the vehicle in the width direction from an upper end of the second side plate 9d, and is attached to the lower surface of the roof panel 4 with adhesive 12. The bracket 9f extends downward, that is, extends approximately vertically from an end of the second upper plate 9e nearer the middle of the vehicle in the width direction so that the bracket 9f has a shape of an approximately vertical plate extending downward. A closed space in a cross section is formed under the roof panel 4 by the first side plate 9b, the lower plate 9c, and the second side plate 9d in cooperation with the roof panel 4. This closed shape structure in the cross section serves as reinforcement. The bracket 9f is connected with the panel support stay 38 as described later.

Figure 7:
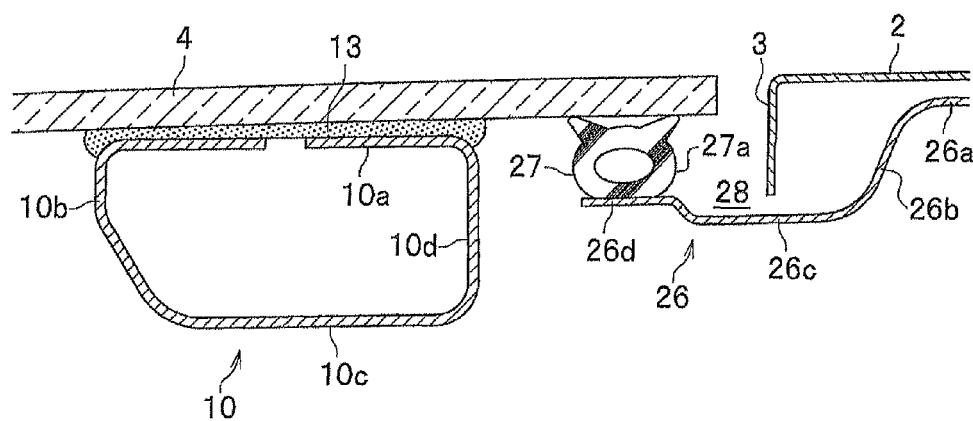
FIG. 7 is an enlarged longitudinal sectional view around the rear edge of the movable roof panel shown in FIG. 2.

As shown in FIG. 7, the rear panel holder 10 has a cross sectional shape having an upper plate 10a, a front plate 10b, a lower plate 10c, and a rear plate 10d. The upper plate 10a is attached to a lower surface of a rear edge portion of the roof panel 4 with adhesive 13. The front plate 10b extends downward from a front end of the upper plate 10a. The lower plate 10c extends rearward from a lower end of the front plate 10b approximately in parallel with the panel surface of the roof panel 4. The rear plate 10d extends upward from a rear end of the lower plate 10c to connect with a rear end of the upper plate 10a. A closed cross sectional shape having an approximately rectangular shape is formed by these four plates. The rear panel holder 10 is attached to the lower surface of the roof panel 4 at a slightly forward location apart from the rear edge of the roof panel 4.

As shown in FIG. 11, each of end portions of the front panel holder 8 and each of front end portions of the two side panel holders 9 are connected with each other through a front joint member 29. And each of end portions of the rear panel holder 10 and each of rear end portions of the two side panel holders 9 are connected with each other through a rear joint member 30. Upper surfaces of front joint members 29 and rear joint members 30 are attached to the lower surface of the roof panel 4 at four corners of the roof panel 4 with adhesive or the like. The front joint members 29 and the rear joint members 30 are made of material such as plastics.

As shown in FIG. 2, a front roof rail 15 is attached to an inner surface of an upper edge portion of the front window 5 with adhesive 14. The front roof rail 15 is a member extending in the width direction to give strength to the front window 5, and has an approximately closed cross sectional shape. Furthermore, the front roof rail 15 is made of a metal plate, for example, a bended galvanized steel plate formed by bending like roll forming.

As shown in FIG. 5, the front roof rail 15 has an approximately closed cross sectional shape having an attaching plate 15a, an upper rear plate 15b, a concave plate 15c, a support plate 15d, a lower rear plate 15e, a lower plate (bottom part) 15f, and a slant plate 15g. The attaching plate 15a is attached to the inner surface of the upper edge portion of the front window 5 with the adhesive 14. The upper rear plate 15b extends downward and approximately orthogonally to a window surface of the front window 5 from a rear end of the attaching plate 15a. The concave plate 15c extends rearward and downward being curved from a lower end of the upper rear plate 15b, and extends rearward and upward to form a concavity projecting downward. The support plate 15d extends rearward and approximately horizontally from a rear end of the concave plate 15c. The lower rear plate 15e extends downward and approximately vertically from a rear end of the support plate 15d. The lower plate 15f extends slantingly forward and downward from a lower end of the lower rear plate 15e. The slant plate 15g extends slantingly forward and upward from a front end of the lower plate 15f. An upper end of the slant plate 15g is located at the most forward end location of the front roof rail 15 in the cross section. And a part near the upper end of the slant plate 15g is bended rearward and upward to be located adjacently to or to be connected to a front edge of the attaching plate 15a In accordance with the cross sectional shape of the front roof rail 15 mentioned above, the closed cross sectional space 16 of the front roof rail 15 has a front space 16a and a rear space 16b. The front space 16a and the rear space 16b communicate with each other through a narrow portion 16c of an approximate border between them. The narrow portion 16c is formed by reducing a distance between the concave plate 15c and the slant plate 15g. The front space 16a is surrounded mainly by the attaching plate 15a, the upper rear plate 15b, and the slant plate 15g. And the rear space 16b is surrounded mainly by the support plate 15d, the lower rear plate 15e, and the lower plate 15f. The front space 16a is located under the attaching plate 15a for being attached to the front window 5. The rear space 16b is communicated with a lower and rear portion of the front space 16a and is located under the front edge of the roof panel 4, that is, under the front panel holder 8, when the opening 3 is closed.

A joint section 17 between edges of the plate is formed because the front roof rail 15 is a member formed by bending one metal plate as mentioned above. FIG. 5 shows that the front roof rail 15 is formed so that the joint section 17 is located in the attaching plate 15a. The rigidity of the front roof rail 15 is enhanced by sealing the joint section 17 with the adhesive 14. As another example, a patch member 18 of a separate member may be welded to the attaching plate 15a to seal the joint section 17. In this case of the patch member 18, it is not required to seal with the adhesive 14. Therefore, the front roof rail 15 may be formed so that the joint section 17 is located at someplace except the attaching plate 15a.

Then, a drain channel for draining rainwater or the like is equipped under the whole peripheral edge portion of the roof panel 4. At first, as shown in FIG. 5, a front roof stiffener 19 extending in the width direction is equipped over the front roof rail 15. The front roof stiffener 19 has a cross sectional shape having a base plate 19a, a side plate 19b, a bottom plate 19c, and a seal attaching plate 19d. The base plate 19a is located between the upper edge portion of the front window 5 and the attaching plate 15a of the front roof rail 15. The side plate 19b extends downward and approximately orthogonally to the window surface of the front window 5 from a rear end of the base plate 19a. The bottom plate 19c extends rearward and approximately horizontally from an end of the side plate 19b. The seal attaching plate 19d is bended slightly upward from a rear end of the bottom plate 19c and then extends rearward and approximately horizontally. A front end portion of the base plate 19a of the front roof stiffener 19 is fixed to the upper edge portion of the front window 5 and the attaching plate 15a of the front roof rail 15 by interposing the adhesive 14. And both lower surfaces of a rear portion of the bottom plate 19c and the seal attaching plate 19d are attached to the support plate 15d of the front roof rail 15 by interposing an adhesive 20.

A seal member 21 extending in the width direction is fixed to an upper surface of the seal attaching plate 19d with adhesive or the like. The seal member 21 is made of rubber having a shape such as a hollow closed cross sectional shape. The lower plate 8c of the front panel holder 8 is pressed onto the seal member 21 when the opening 3 is closed. Therefore, an area around the front edge of the roof panel 4 becomes watertight. Thus, water is prevented from entering the interior of the vehicle. That is, the front edge portion of the roof panel 4 is placed over the rear space 16b of the front roof rail 15 through the front roof stiffener 19. And, a drain channel 22 is defined by the side plate 19b, the bottom plate 19c, and the front side surface 21a of the seal member 21. Water dropped in the drain channel 22 is drained out through drain holes (not shown) formed at both end portions of the drain channel 22 in the width direction, and then, is drained out through front pillars.

As shown in FIG. 4, a side roof stiffener 23 extending in a front-rear direction of the vehicle is equipped under each side edge of the roof panel 4. The side roof stiffener 23 has a cross sectional shape having a connection plate 23a, a first side plate 23b, a bottom plate 23c, a second side plate 23d, and a seal attaching plate 23e. The connection plate 23a extends approximately horizontal, and is connected to a body frame of the vehicle not shown. The first side plate 23b extends downward and approximately vertically from an end of the connection plate 23a nearer the middle of the vehicle in the width direction. The bottom plate 23c extends approximately horizontally from a lower end of the first side plate 23b toward the middle of the vehicle in the width direction. The second side plate 23d extends upward and approximately vertically from an end of the bottom plate 23c nearer the middle of the vehicle in the width direction. The seal attaching plate 23e extends toward the middle of the vehicle in the width direction from an upper end of the second side plate 23d slantingly slightly upwards.

A seal member 24 extending in the front-rear direction of the vehicle is fixed to an upper surface of the seal attaching plate 23e with adhesive or the like. In addition, the seal member 24, the seal member 21 and a seal member 27 described later are one piece member having a rectangle frame shape in plan view. The lower plate 9c of the side panel holder 9 is pressed onto the seal member 24 when the opening 3 is closed. Therefore, an area around each side edge of the roof panel 4 becomes watertight. Thus, water is prevented from entering the interior of the vehicle. And a drain channel 25 is defined by the first side plate 23b, the bottom plate 23c, and the second side plate 23d. Water dropped in the drain channel 25 is drained out through a drain hole (not shown), and then, is drained out through the front pillar, a center pillar, or the like.

As shown in FIG. 7, a rear roof stiffener 26 extending in the width direction is equipped under the rear edge of the roof panel 4. The rear roof stiffener 26, the front roof stiffener 19, and the side roof stiffeners 23 are one piece member having a rectangle frame shape in plan view. The rear roof stiffener 26 has a cross sectional shape having a connection plate 26a, a side plate 26b, a bottom plate 26c, and a seal attaching plate 26d. The connection plate 26a extends approximately horizontally, and is connected to a body frame of the vehicle not shown. The side plate 26b extends approximately downward from a front end of the connection plate 26a. The bottom plate 26c extends forward and approximately horizontally from a lower end of the side plate 26b. The seal attaching plate 26d extends forward and approximately horizontally from a front end of the bottom plate 26c through a short slant portion slanting upward from the front end of the bottom plate 26c.

A seal member 27 extending in the width direction is fixed on an upper surface of the seal attaching plate 26d with adhesive or the like. As mentioned above, regarding the front edge portion and the side edge portions of the roof panel 4, the front panel holder 8 and the side panel holders 9 are pressed onto the seal members 21 and 24, respectively, when the opening 3 is closed. However, regarding the rear edge portion of the roof panel 4, the rear panel holder 10 is not pressed onto the seal member 27, but a lower surface of the rear edge portion of the roof panel 4 is pressed onto the seal member 27. Thus, an area around the rear edge of the roof panel 4 becomes watertight, and, water is prevented from entering the interior of the vehicle. A drain channel 28 is defined by the side plate 26b, the bottom plate 26c, and a rear side surface 27a of the seal member 27. Water dropped in the drain channel 28 is drained out through drain holes (not shown) formed at both end portions of the drain channel 28 in the width direction, and then, is drained out through center pillars.

Regarding an area around the rear edge of the roof panel 4, the lower surface of the roof panel 4 is pressed directly onto the seal member 27 without interposing the rear panel holder 10. As a result, there is a following problem. Regarding the side edge portions of the roof panel 4, as shown in FIG. 4, the side panel holder 9 is pressed onto the seal member 24. Therefore, there exists a distance corresponding to a height of the side panel holder 9 between the roof panel 4 and the seal member 24. On the other hand, as shown in FIG. 7, a distance between the roof panel 4 and the seal member 27 is zero. Therefore, regarding a part around a rear end of the seal attaching plate 23e of the side roof stiffener 23, the part is formed to be a slant plate 23f which gradually approaches the roof panel 4 as it goes rearward, as shown in FIG. 12A. In the consequence, a part around a rear end of the lower plate 9c of the side panel holder 9 is also formed to be a slant plate 9g (refer to FIG. 11 also) as it goes rearward so that the part can be pressed onto the seal member 24 following the slant plate 23f to be slant.

In a case where the side panel holder 9 is extended up to a more rearward location than the case of FIG. 12A as shown in FIG. 12B, a gap G is generated because of a plate thickness of the lower plate 9c (or 9g) among a rear end surface of the lower plate 9c, the roof panel 4, and the seal member 24. Thus, a sufficient watertight state may not be obtained. On the other hand, as shown in FIG. 12A, no gap G is generated by equipping a rear joint member 30 just behind the side panel holder 9. A lower surface 30b of the rear joint member 30 is formed to be a slant surface which becomes flush with a lower surface of the slant plate 9g of the side panel holder 9. The slant surface 30b extends rearward up to a location abutting against the lower surface of the roof panel 4 (refer to FIG. 11 also). As a result, the expected watertight performance can be obtained without generating the gap G. A rear end of the lower plate 9c (or 9g) cannot be cut in an acute angle so as not to generate the gap G because the side panel holder 9 is made of a metal plate or sheet. On the other hand, in a case where the rear joint member 30 is made of plastics having an excellent formability, a rear edge 30a of the rear joint member 30 can be easily formed to have a pointed acute angle in side view.

Next, an open-and-close mechanism of the roof panel 4 will be described hereinafter.

As shown in FIG. 4, a left guide frame 31 extending in the front-rear direction of the vehicle is fixed under each of two side edge portions of the roof panel 4. The guide frame 31 has a cross sectional shape having a cable channel 33 and a guide rail channel 35. The cable channel 33 is a channel to insert thereinto a push-pull cable 32 which can be reciprocated in the front-rear direction by a drive motor not shown. The guide rail channel 35 is a channel to guide a drive slider 34 connected to the push-pull cable 32 to slide in the front-rear direction. A connected part between the push-pull cable 32 and the drive slider 34 is not shown. The guide frame 31 is made, for example, by extrusion of aluminum alloy.

The drive slider 34 has a body 34A of a vertical plate standing up vertically or along the guide frame 31, and a plurality of shoes 34B protruding left and right from a lower part of the body 34A at front and rear edge portions of the body 34A. The shoes 34B slide in the guide rail channel 35. Each shoe 34B may be formed integrally with the body 34A, or may be formed as a separate member. As shown in FIG. 2, a first lift guide channel 36 and a second lift guide channel 37 are formed in the body 34A at a front part thereof and a rear part thereof, respectively. Each channel passes through the body 34A in the width direction (of the vehicle), that is, in a left-right direction of the vehicle.

The first lift guide channel 36 has a first horizontal stroke 36A extending approximately horizontally, a first slant stroke 36B slantingly extending forward and slightly upward from a front end of the first horizontal stroke 36A, a second horizontal stroke 36C extending approximately horizontally and forward from an upper end of the first slant stroke 36B, and a second slant stroke 36D slantingly extending forward and upward from a front end of the second horizontal stroke 36C. The second lift guide channel 37 has a first horizontal stroke 37A extending approximately horizontally, a slant stroke 37B slantingly extending forward and upward from a front end of the first horizontal stroke 37A, and a second horizontal stroke 37C extending approximately horizontally and forward from an upper end of the slant stroke 37B.

Figure 3:
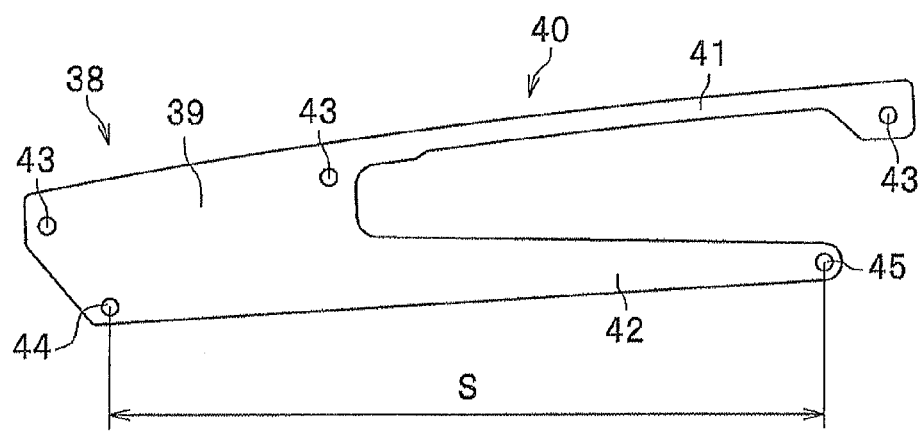
FIG. 3 is a side view of a panel support stay.

A panel support stay 38 is interposed between the roof panel 4 and the drive slider 34. With reference to FIGS. 2 and 3, the panel support stay 38 is a vertical plate and has a base plate part 39 at the front half part thereof and a forked part 40 at the rear half part thereof. The forked part 40 has an upper part 41 connected to the roof panel 4 and a lower part 42 engaged with the drive slider 34. The forked part 40 has an opening facing rearward. The upper part 41 extends approximately in the front-rear direction along a lower surface of the roof panel 4. One of a plurality of connection pins 43 is connected to the upper part 41 at a rear end portion of the upper part 41. The lower part 42 also extends approximately in the front-rear direction and a second lift guide pin 45 is attached to the lower part 42 at a rear end portion of the lower part 42 as described later.

In FIG. 4, a part of the side panel holder 9 is formed as the bracket 9f of a vertical plate as mentioned above. As shown in FIG. 2, an upper edge portion of the base plate 39 of the panel support stay 38 and the upper part 41 are connected to and fixed to the bracket 9f by a plurality of connection pins 43. The first lift guide pin 44 and the second lift guide pin 45 are attached to a lower front edge portion of the base plate 39 and to a rear edge portion of the lower part 42 of the panel support stay 38, respectively. The first lift guide pin 44 and the second lift guide pin 45 are engaged with the first lift guide channel 36 and the second lift guide channel 37 of the drive slider 34, respectively so that the first lift guide pin 44 and the second lift guide pin 45 can slide in the channel 36 and in the channel 37, respectively.

In addition, the panel support stay 38 may be formed integrally with the side panel holder 9, or may be directly attached to the lower surface of the roof panel 4 with adhesive or the like without interposing the side panel holder 9.

<Operation>

An operation of the sunroof apparatus 1 will be described mainly with reference to FIGS. 8A, 8B, 9A and 9B. The side panel holder 9 is omitted in FIGS. 8A, 8B, 9A and 9B. FIG. 8A shows a state where the opening 3 is closed by the roof panel 4. On this occasion, the drive slider 34 is located at the most forward location. And the first lift guide pin 44 is located at the first horizontal stroke 36A of the first lift guide channel 36, and the second guide pin 45 is located at the first horizontal stroke 37A of the second lift guide channel 37. The front panel holder 8 is pressed onto the seal member 21 under the front edge portion of the roof panel 4. The side panel holder 9 is pressed onto the seal member 24 under each side edge portion of the roof panel 4 (refer to FIG. 4). Furthermore, a lower surface of the roof panel 4 is pressed onto the seal member 27 under the rear edge portion of the roof panel 4. As a result, the sufficient watertight state can be secured so that water is prevented from entering the interior of the vehicle through the periphery of the roof panel 4.

The drive slider 34 moves rearward through the push-pull cable 32 (FIG. 4) because of driving force of the motor not shown from the state shown in FIG. 8A, so that a lower wall of the first slant stroke 36B of the first lift guide channel 36 pushes up the first lift guide pin 44, and a lower wall of the slant stroke 37B of the second lift guide channel 37 pushes up the second lift guide pin 45. Thus, the roof panel 4 is moved slightly rearward and is tilted up. FIG. 8B shows a state where the above tilting up is completed. On this occasion, the first lift guide pin 44 is located in the second horizontal stroke 36C of the first lift guide channel 36, and the second lift guide pin 45 is located in the second horizontal stroke 37C of the second lift guide channel 37.

The drive slider 34 moves furthermore rearward from the state shown in FIG. 8B, so that the roof panel 4 moves rearward because a lower wall of the second slant stroke 36D of the first lift guide channel 36 pushes the first lift guide pin 44 rearward as shown in FIG. 9A.

FIG. 9B shows a state where the roof panel 4 has moved to the rearmost location so that the opening 3 is fully opened. On this occasion, the upper part 41 of the panel support stay 38 is located over the outer roof panel 2 behind the opening 3, and the lower part 42 is located under the outer roof panel 2 behind the opening 3. That is, the forked part 40 of the panel support stay 38 is located to sandwich the outer roof panel 2 behind the opening 3 vertically. As shown clearly in FIG. 9B, the second lift guide pin 45 is located at a more rearward location than a rear edge of the opening 3.

Two pins connecting a panel support stay and a slider in a prior structure described in Japanese Patent Laid-open Publication No. 2005-41345 are located at a more forward location than a rear edge of the opening when the opening is fully opened. In the above prior structure, unless the forward pin is equipped at a more forward location, for example, by extending a front end of each guide rail forward, it is difficult to enlarge a distance between the two pins, that is, a support span to support a weight of the roof panel supported by the slider. In this prior structure, the two pins are located at more forward locations excessively than a gravitational center of the roof panel. Therefore, a large load is applied on the panel support stay because of a large moment.

On the other hand, in the present embodiment, the second lift guide pin 45 is located at a more rearward location than the rear edge of the opening 3 when the opening 3 is fully opened. That is, a part of the engaging portions between the panel support stay 38 and the drive slider 34, which is a part of support portions to support the weight of the roof panel 4, is located at a more rearward location than the rear edge of the opening 3. Therefore, a support span S (refer to FIG. 3) to support the roof panel 4 can be kept long while opening quantity of the opening 3 is fully kept without taking specific measures, for example, extending the front end of the guide frame 31 forward. Furthermore, the load applied to the panel support stay 38 can be decreased because one of the support portions for the weight of the roof panel 4 is located at a more rearward location than the prior structure to be closer to the gravitational center of the roof panel 4.

Furthermore, the panel support stay 38 is formed to have the forked part 40 in a forked shape. The upper part 41 of the forked part 40 is connected to the roof panel 4 and the lower part 42 of the forked part 40 is engaged with the drive slider 34. And the panel support stay 38 has the opening between the upper part 41 and the lower part 42 so that the opening faces rearward. The forked part 40 is located to sandwich the outer roof panel 2 behind the opening 3 vertically when the opening 3 is fully opened, as shown in FIG. 9B. Therefore, the simple panel support stay 38 can be formed and the support span S for the roof panel 4 can become long.

As mentioned above, the sunroof apparatus 1 has an opening 3 in the outer roof panel 2 to be closed by the structure that the front edge of the roof panel 4 is located at a location adjacent to the upper edge of the front window without interposing the outer roof panel 2 between the front edge of the roof panel 4 and the upper edge of the front window 5. That is, there exists no outer roof panel 2 between the front edge of the roof panel 4 and the upper edge of the front window 5 according to the sunroof apparatus 1 of the present embodiment, so a field of view in a slantingly forward and upward direction can be improved by that much. In prior arts (for example, Japanese Patent Laid-open Publication No. 2010-163112), the front roof rail is made of an upper member and a lower member, that is, made of two members. In consequence, flanges with which the two members are welded each other tend to prevent a person in the vehicle from viewing the outside. On the other hand, the front roof rail 15 according to the present embodiment is made of a metal plate bended so as to have an approximately closed cross sectional shape. Therefore, no flange is needed. As a result, the field of view in the slantingly forward and upward direction can be enlarged by that much. The front roof rail 15 is located so that at least a part (front space 16a) of the closed cross sectional space 16 is located under a portion of the front window 5 which the front roof rail 15 is attached to. Therefore, the front window 5 can be sufficiently reinforced by the front roof rail 15.

Figure 6:
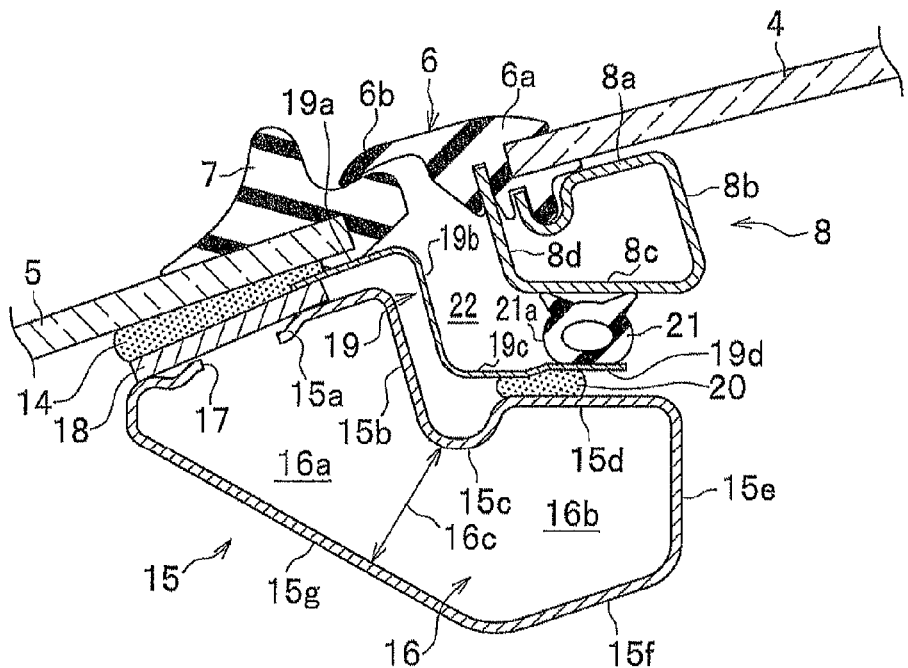
FIG. 6 is another enlarged longitudinal sectional view around the front edge of the movable roof panel according to another embodiment different from FIG. 5.

In a case where the joint section 17 of the front roof rail 15 is closed with the patch member 18 as shown in FIG. 6, the rigidity (specifically, torsional rigidity) of the front roof rail 15 can be further enhanced. In the case where the front roof rail 15 is attached to the front window 5 with the adhesive 14 as shown in FIG. 5 showing the present embodiment, the rigidity of the front roof rail 15 can be easily enhanced by a simple structure closing also the joint section 17 with the adhesive 14.

The load from the roof panel 4 can be effectively received by the rigidity of the closed cross sectional space 16 in a case where the front edge portion of the roof panel 4 is located over the closed cross sectional space 16 of the front roof rail 15, specifically, the rear space 16b when the opening 3 is closed. Furthermore, a flange or the like to receive the front edge portion of the roof panel 4 is not needed to be specifically formed, so a structure around the front edge portion of the roof panel 4 becomes compact. Therefore, a crossing angle θ between view lines V1 and V2 becomes small and the field of view in the slantingly forward and upward direction can be enlarged, as shown in FIG. 10.

Figure 10:
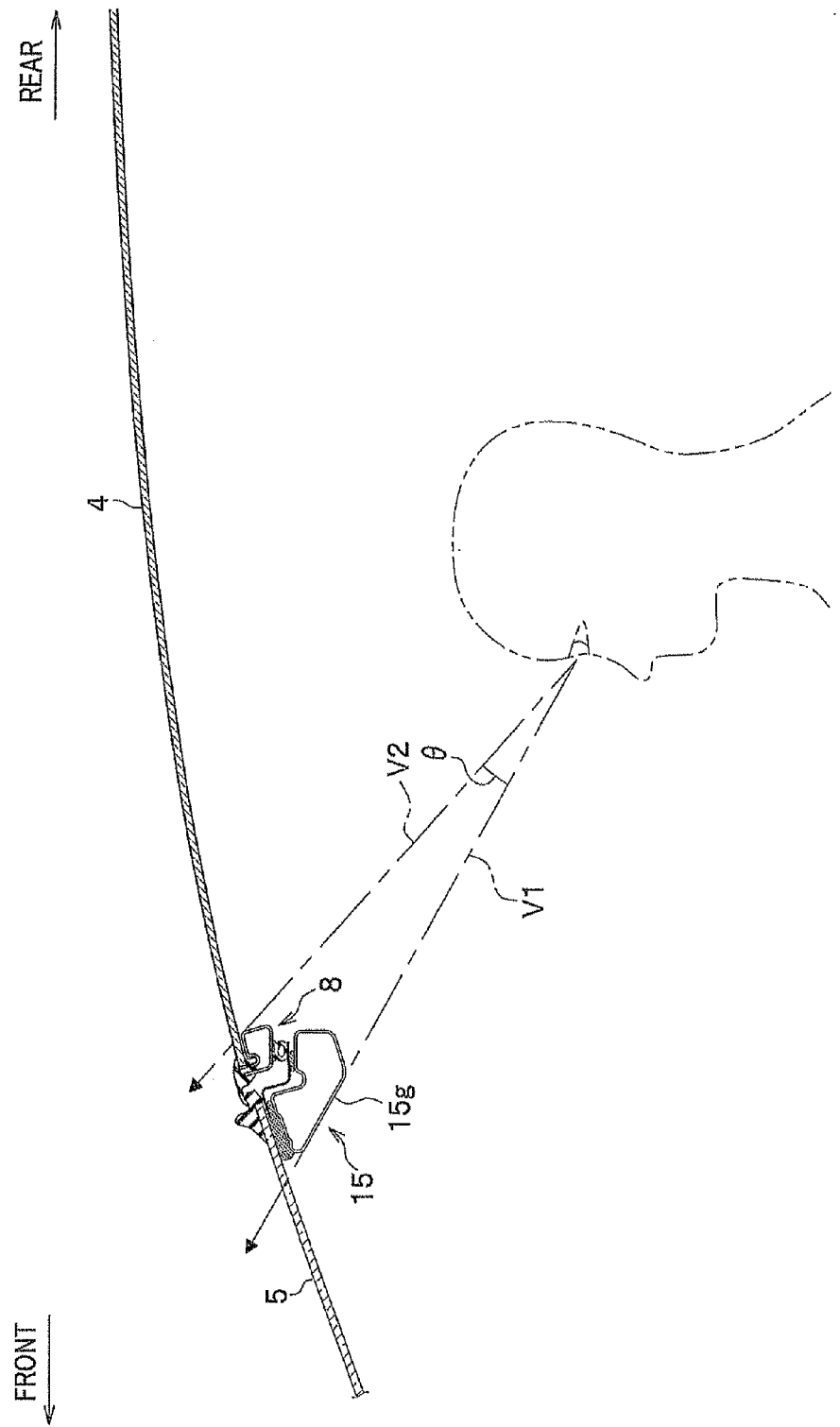
FIG. 10 is a longitudinal sectional view for explaining a field of view around a front roof rail.

In a case where at least a part (front space 16a) of the closed sectional space 16 is located under the portion of the front window 5 which the front roof rail 15 is attached to, and the front roof rail 15 has a slant plate 15g which extends slantingly forward and upward from a lower end thereof, and is in a lower front area of the front roof rail 15, an upper end of the slant plate 15g being located at the most forward end location in the approximately closed cross sectional shape of the front roof rail 15, the view line V1 seen from a seated person can be kept along a surface of the slant plate 15g as shown in FIG. 10. Therefore, the field of view for the front window 5 can be enlarged.

In a case where the front panel holder 8 is pressed onto the seal member 21 under the front edge portion of the roof panel 4, and the lower surface of the roof panel 4 is directly pressed onto the seal member 27 under the rear edge portion of the roof panel 4, when the opening 3 is closed, a vertical dimension of the sealing structure around the rear edge of the roof panel 4 becomes shorter than a case where the rear panel holder 10 is pressed onto the seal member 27. As a result, a large head clearance can be ensured by that much.

In a case where the seal member 24 is pressed onto the slant surface 30b of the rear joint member 30 which is made of plastics and has the slant surface 30b slanting in an upper and rearward direction up to the rear edge 30a of the rear joint member 30, the rear edge 30a being approximately in contact with the lower surface of the roof panel 4, the seal member 24 extending up to the lower surface of the rear edge portion of the roof panel 4 from a part abutting against the side panel holder 9 so that the seal member 24 abuts against the lower surface of the rear edge portion of the roof panel 4, the gap G as shown in FIG. 12B is prevented from generating between the roof panel 4 and the seal member 24. Therefore, a watertight state by using the seal member 24 can be enhanced thanks to the rear joint member 30.

In a case where the drain channels 22 and 28 are defined by using the front roof stiffener 19 and the seal member 21 and by using the rear roof stiffener 26 and the seal member 27, respectively, that is, each of the seal member 21 and 27 operates as a part of walls of the drain channel 22 or the drain channel 28, a drain structure shares a partial structure thereof with a watertight structure. Therefore, structures around the drain channels 22 and 28 are compact. Furthermore, cross sectional shapes of the front roof stiffener 19 and the rear roof stiffener 26 are also simple. The seal member 24 also may be adopted as a part of side walls of the drain channel 25 in the case of the side roof stiffener 23.

As mentioned above, the preferred embodiment of the present invention has been described. In the above-mentioned embodiment, the drive slider 34 is formed to be one piece. However, the drive slider 34 may be formed to have a plurality of pieces.

DESCRIPTION OF REFERENCE NUMERALS

1 Sunroof apparatus
2 (Fixed) outer roof panel
3 Opening
4 (Movable) roof panel
5 Front window
8 Front panel holder
9 Side panel holder
10 Rear panel holder
15 Front roof rail
15f Lower plate part (bottom part)
16 Closed cross sectional space
17 Joint section
18 Patch member
19 Front roof stiffener
21 Seal member
22 Drain channel
23 Side roof stiffener
24 Seal member
25 Drain channel
26 Rear roof stiffener
27 Seal member
28 Drain channel
29 Front joint member
30 Rear joint member
31 Guide frame
34 Drive slider
36 First lift guide channel
37 Second lift guide channel
38 Panel support stay
39 Base plate part
40 Forked part
41 Upper part
42 Lower part
43 Connection pin
44 First lift guide pin
45 Second lift guide pin

What is claimed is:

1. A sunroof apparatus comprising a movable roof panel installed in an opening formed in a fixed outer roof panel of a vehicle, a drive slider to move in a front-rear direction of the vehicle along a fixed guide frame, and a panel support stay interposing between the movable roof panel and the drive slider to support the roof panel, the movable roof panel being tilted up and moving rearward by rearward moving of the panel support stay while the panel support stay is in an inclined position, as the drive slider slides rearward, wherein a part of a plurality of engagement portions between the panel support stay and the drive slider is located at a more rearward location than a rear edge of the opening when the opening is fully opened, wherein the panel support stay includes a forked part having an upper part to be connected to the roof panel and a lower part to be engaged with the drive slider so as to form an opening facing rearward between the upper part and the lower part, and wherein the forked part is located so that the upper and the lower parts thereof face each other vertically across the fixed outer roof panel located behind the opening in the fixed outer roof panel when the opening in the fixed outer roof panel is fully opened.

* * * * *